: 2,980,635
Patented Apr. 18, 1961

2,980,635

ION-EXCHANGE ARTICLES AND METHOD OF MANUFACTURE FROM ACRYLONITRILE POLYMER AQUAGELS

Clyde W. Davis, Antioch, and Forrest A. Ehlers and Robert D. Barnard, Walnut Creek, Calif., assignors to The Dow Chemical Company, Midland, Mich., a corporation of Delaware No Drawing. Filed Feb. 7, 1957, Ser. No. 638,670

7 Claims. (Cl. 260—2.1)

This invention concerns articles of manufacture such as sheets, films, fibers, fabrics and the like composed of polymeric materials which are characterized by a permanently open or gel-like structure, which contain a substantial proportion of a finely divided ion-exchange resin dispersed throughout their mass. It also concerns the method of manufacture of such articles.

In accordance with this invention it has now been discovered that sheets, films, fibers and fiber-containing structures can be prepared from polymeric fiber-forming resins in the aquagel state which contain in dispersed form a substantial proportion of finely divided anion and/or cation-exchange resin. Articles prepared therefrom are useful in the ion-exchange art. A preferred form of this invention comprises fibers or films of polyacrylonitrile or polymeric acrylonitrile containing at least 80 percent bound acrylonitrile in the aquagel state containing a dispersion of a finely divided cation and/or anion exchange resin. The aquagel state provides the necessary open structure for the ion-exchange articles of this invention. Structures in the aquagel state can be formed by any wet method wherein the coagulating liquid comprises water. Solutions of polymeric acrylonitrile in water-miscible solvents such as a concentrated solubilizing salt solution, dimethyl sulfoxide, dimethyl formamide, butyrolactone, ethylene carbonate, etc., can be coagulated in water, aqueous solutions of salts, alcohol, glycerol and the like. The ion exchange articles of this invention are obtained by coagulating in the form of a sheet, film, fiber, or the like, a mixture of a solution of the polymer and a dispersion of an ion exchange resin in the same type of solvent. The coagulation is performed in an aqueous coagulating bath. The preferred articles are advantageously obtained by spinning a mixture of a solution of a fiber-forming polymeric acrylonitrile in a concentrated solubilizing salt solution and a dispersion of one or more ion-exchange resins in the same type of concentrated salt solution into a less concentrated or essentially aqueous coagulating bath. It has been found that when the aquagel structure is destroyed, as by heating to remove water, the ion exchange ability is also destroyed.

Both homopolymers and copolymers of acrylonitrile containing at least 80 percent bound acrylonitrile, hereinafter referred to as polymeric acrylonitrile, can be used in preparing the aquagels utilized in this invention. Comonomers advantageously polymerized together with acrylonitrile to form polymers useful in this invention include one or more of the following: allyl alcohol, vinyl acetate, methacrylamide, methyl acrylate, 2-vinyl pyridine, dimethyl aminoethylacrylate, methacrylonitrile, acrylic acid, itaconic acid, vinyl acetic acid, ethyl acrylate, fumaronitrile, 2-vinyl-5-ethyl pyridine, ethylene sulfonic acid and its alkali metal salts, allyl sulfonic acid and its alkali metal salts, and the like.

In practice, a dispersion of one or more ion-exchange resins in a water-miscible solvent for the polymeric acrylonitrile is prepared by ball milling or equivalent mechanical dispersing means. Such ion-exchange resin dispersion is then mixed into a solution of the matrix forming polymeric acrylonitrile in the same solvent as used for preparing the ion exchange resin dispersion. The resulting mixture is cast into sheets, films or spun into fibers, coagulated in water, advantageously ice-water, washed in a solution of dilute mineral acid, alkali metal salt, or base, depending upon whether a cation or anion exchange article is being prepared, and stretched to several times its original length in an atmosphere of moist steam. Fibers and filaments are given a coagulating bath stretch as well as a hot-stretch to give necessary strength. The sheets, films, and fibers so prepared are in the aquagel state, and contain about 50 percent by weight of water in their structure. They are formulated to contain between 10 and 50 percent by weight ion-exchange resin, dry weight basis. The fibers are advantageously woven into fabrics or cloths. The sheets, films, fibers and fabrics so prepared are useful as ion-exchange materials, particularly in counter-current and permselective processes.

The following examples illustrate ways in which the invention has been practiced.

*Example 1*

A dispersion of 10 parts by weight of a sulfonated polymer of styrene cross-linked with divinylbenzene in 90 parts of a 60 percent by weight solution of zinc chloride in water was prepared by ball mill grinding the mixture. A quantity of 61 grams of such dispersion was mixed with 239 grams of a solution of polyacrylonitrile, M.W. ca. 35,000, in 60 percent zinc chloride solution to provide a solution containing 10.2 percent by weight of polyacrylonitrile. The mixture was then spun into fibers through a spinnerette having 20 mil diameter holes. The fibers were coagulated in ice water, washed in a solution containing 1 percent by weight of hydrogen chloride and stretched to 3 times their original length in an atmosphere of moist steam. The fibers so prepared were in the aquagel state, and contained about 50 percent by weight of water in their structure. They also contained about 20 percent by weight of cation exchange resin, dry weight basis. A quantity of 1.079 grams of the fibers, dry weight basis, was mixed with excess 0.1089 N sodium hydroxide which was then back-titrated with standard hydrochloric acid. It was found that 5.8 ml. of the base had been consumed, equivalent to 0.586 milliequivalent per gram of fiber or 2.93 milli-equivalents per gram of cation exchange resin.

*Example 2*

Another mixture was prepared from 100 g. of the dispersion of cation exchange resin and 98 g. of the polyacrylonitrile solution of Example 1. The mixture was cast into a layer 18 mils thick, and the polyacrylonitrile coagulated by washing with water. The resulting sheet was washed free of zinc chloride with water at 25° C., resulting in an aquagel structure containing 50 percent by weight of cation exchange resin, dry weight basis. The product was then titrated as in Example 1. It was found that 0.5 gram of the sheet, dry weight basis, absorbed 0.533 milli-equivalent of base. This is equal to 1.07 milli-equivalents per gram of film and 2.14 milli-equivalents per gram of cation exchange resin.

*Example 3*

Another mixture was prepared from 16.1 grams of the cation exchange resin dispersion and 142 grams of the polyacrylonitrile solution as in Example 1. Aquagel fibers prepared from this mixture contained 10 percent by weight of cation exchange resin, dry weight basis. A major proportion of their ion-exchange capacity was available.

By way of contrast and to illustrate the necessity for the open or aquagel type of structure, a mixture of finely divided cation exchange resin dispersion in zinc chloride solution was prepared and spun into fibers as in Example 1. Fibers containing 5 and 10 percent by weight of the cation exchange resin were spun as before and dried at 150° C. All of the water was thereby removed, and the gel collapsed to form dried fibers. When these fibers were tested, they were found to have no ion-exchange capacity at all.

*Example 4*

Eight grams of polyacrylonitrile, molecular weight about 33,000, were dissolved in 30 grams of dimethyl sulfoxide. Two grams of a cation exchanging sulfonated polymer of styrene cross-linked with divinyl benzene were ground to minus 200 mesh and then dispersed in the solution of polymer. The dispersion was cast into a film using a 12-mil bar, coagulated with water and stored in water in the aquagel form. A section of the wet film, dry weight basis 0.2125 gram, containing about 20 percent cation exchange resin, was evaluated as in Example 1. The section consumed 1.32 milliliters of 0.0987 N sodium hydroxide solution, equal to about 3.05 milliequivalents per gram of cation exchange resin.

*Example 5*

The procedure of Example 4 was repeated using ethylene carbonate as the solvent. A section of the wet, aquagel film so produced contained 0.2285 gram dry polymer of which about 20 percent was cation exchange resin. When evaluated as in Example 1, the film consumed 1.41 milliliters of 0.0987 N sodium hydroxide solution, equal to an ion exchange capacity of about 3.04 milliequivalents per gram of cation exchange resin.

What is claimed is:

1. A method of making a polymeric acrylonitrile aquagel ion exchanging composition by mixing a solution of polymeric acrylonitrile consisting of at least 80 percent acrylonitrile in the polymer molecule finely divided, the balance of the polymer molecule being a copolymerized ethylenically unsaturated comonomer, in a water-miscible solvent for such polymer with a dispersion of finely divided particles of an ion exchange resin in such a solvent, passing said mixture into an aqueous coagulating bath, coagulating the mixture in said aqueous coagulating bath and replacing substantially all of the solvent in the polymeric structure with water to form an aquagel therefrom containing about 50 weight percent of water, composition basis.

2. The method of claim 1 in which the water-miscible solvent is a concentrated aqueous solution of zinc chloride and the polymeric acrylonitrile is essentially polyacrylonitrile.

3. A polymeric acrylonitrile aquagel film consisting of a polymer of at least 80 percent acrylonitrile in the aquagel form in the polymer molecule, the balance of the polymer molecule being copolymerized ethylenically unsaturated comonomer, about 50 weight percent of water, aquagel basis, said film having finely divided ion exchange resin particles dispersed therein in amount sufficient to cause the aquagel to function as an ion exchanger.

4. A polymeric acrylonitrile aquagel fiber consisting of a polymer of at least 80 percent acrylonitrile in the aquagel form in the polymer molecule, the balance of the polymer molecule being copolymerized ethylenically unsaturated comonomer, about 50 weight percent of water, aquagel basis, said fiber having finely divided ion exchange resin particles dispersed therein in amount sufficient to cause the aquagel to function as an ion exchanger.

5. The fiber of claim 4 in which the polymeric structure consists essentially of polyacrylonitrile.

6. The fiber of claim 4 in which the ion exchange resin is a cation exchange resin.

7. A polymeric acrylonitrile aquagel composition consisting of a polymer of at least 80 percent acrylonitrile in the aquagel form in the polymer molecule, the balance of the polymer molecule being copolymerized ethylenically unsaturated comonomer, about 50 weight percent of water, composition basis, said aquagel having finely divided ion exchange resin particles dispersed therein in amount sufficient to cause the composition to function as an ion exchanger.

References Cited in the file of this patent

UNITED STATES PATENTS

| | | |
|---|---|---|
| 2,636,851 | Juda et al. | Apr. 28, 1953 |
| 2,688,008 | Chaney | Aug. 31, 1954 |
| 2,731,425 | Juda et al. | Jan. 17, 1956 |
| 2,740,763 | Horn | Apr. 3, 1956 |

UNITED STATES PATENT OFFICE
CERTIFICATE OF CORRECTION

Patent No. 2,980,635　　　　　　　　　　　　　　　April 18, 1961

Clyde W. Davis et al.

It is hereby certified that error appears in the above numbered patent requiring correction and that the said Letters Patent should read as corrected below.

Column 3, lines 37 and 38, strike out "finely divided"; column 4, line 45, for "Horn" read -- Ham --.

Signed and sealed this 26th day of December 1961.

(SEAL)
Attest:

ERNEST W. SWIDER
Attesting Officer

DAVID L. LADD
Commissioner of Patents